United States Patent Office 3,317,565
Patented May 2, 1967

3,317,565
DIHYDROPYRANYL AND TETRAHYDROPYRANYL CARBINOLS AND O-ACYL DERIVATIVES THEREOF
Ernst Seeger, Biberach an der Riss, Germany, assignor, by mesne assignments, to Boehringer Ingelheim G.m.b.H., Ingelheim am Rhine, Germany, a corporation of Germany
No Drawing. Filed Jan. 8, 1963, Ser. No. 250,005
Claims priority, application Germany, Jan. 15, 1960, T 17,730
8 Claims. (Cl. 260—345.8)

This is a continuation-in-part of copending application Ser. No. 78,811, filed December 28, 1960, now abandoned.

This invention relates to dihydropyranyl carbinols and O-acyl derivatives thereof.

More particularly, the present invention relates to novel compounds of the formula

wherein $R_1$ is unsubstituted dihydropyranyl,
Z is alkylene with 1 to 6 carbon atoms,
$R_2$ is hydrogen, phenyl or substituted phenyl, especially lower alkoxy-phenyl and lower alkylphenyl, and
Y is hydrogen or the acyl radical of an organic hydrocarbon carboxylic acid, preferably of 1 to about 7 carbon atoms in the hydrocarbon moiety.

Those of the novel compounds of the Formula I above wherein Y is hydrogen may be prepared by reacting a dihydropyran-aldehyde of the formula

$$R_1\text{—CHO} \qquad (II)$$

wherein $R_1$ has the meanings previously defined in connection with Formula I, with an organo-magnesium-halide of the formula $$\text{Hal—Mg—Z—}R_2 \qquad (III)$$

wherein Z and $R_2$ have the meanings previously defined in connection with Formula I and Hal is halogen. The reaction is carried out under conditions which are customary for Grignard reactions, that is, in the presence of an inert organic solvent, such as ether, benzene, tetrahydrofuran, dioxane, dibutylether, or mixtures of such solvents. The organo-magnesium-halide is advantageously employed in moderate excess over the stoichiometrically required amount, preferably in an excess of 0.2 to 0.5 mol. The aldehyde II is preferably slowly added to the organo-magnesium halide while maintaining the reaction mixture at substantially room temperature or below, and after all of the aldehyde has been added the reaction mixture is heated to a moderately elevated temperature in order to permit the reaction to go to completion.

To separate the reaction product from the reaction mixture the latter is decomposed into a two-phase system with the aid of a dilute aqueous acid, preferably a dilute aqueous mineral acid.

The above-described process yields dihydropyranyl-carbinols, that is, compounds having the structural Formula I above wherein Y is hydrogen.

In order to obtain the O-acyl derivatives of the dihydropyranyl-carbinols, that is, compounds of the Formula I wherein Y is the acyl radical of a hydrocarbon carboxylic acid with preferably 1 to about 7 carbon atoms in the hydrocarbon moiety, the hydroxyl group of the carbinols is acylated with the corresponding hydrocarbon carboxylic acid or its anhydride or a corresponding hydrocarbon carboxylic acid halide. Examples of suitable hydrocarbon acids are acetic acid, propionic acid, succinic acid, maleic acid, benzoic aid, phenylacetic acid and the like.

The following examples illustrate the present invention and will enable others skilled in the art to understand it more completely. It should be understood, however, that the invention is not strictly limited to the particular compounds and methods illustrated in these examples.

EXAMPLE I (5,6-dihydropyranyl-3)-propyl-carbinol

A solution of 23 gm. of 3-formyl-5,6-dihydropyran in ether was added dropwise at room temperature accompanied by stirring to a Grignard reagent prepared from 7.5 gm. magnesium and 38 gm. propyl bromide in anhydrous ether. After all of the solution had been added, the reaction mixture was stirred for an additional half hour accompanied by slight heating. The reaction mixture was then allowed to cool and was decomposed into a two-phase system by adding water and acetic acid while cooling. The ethereal phase was separated and the aqueous phase was again extracted with ether. The combined ethereal solutions were washed with an aqueous sodium bicarbonate solution, dried over sodium sulfate and the ether solvent was driven off by heating. The residue remaining behind was distilled. 10 gm. of a colorless liquid having a boiling point of 87 to 88° C. at 0.2 mm. Hg were obtained. It was identified to be the compound of the formula

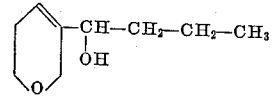

EXAMPLE II (5,6-dihydropyranyl-3)-benzyl-carbinol

A solution of 57 gm. of 3-formyl-5,6-dihydropyran in 100 ml. of a mixture of benzene and tetrahydrofuran (1:1) was added dropwise to a Grignard reagent prepared from 18 gm. magnesium powder and 95 gm. benzyl chloride in 200 ml. of a mixture of benzene and tetrahydrofuran (1:1), while cooling to 10 to 20° C. and stirring. After all of the solution had been added, the reaction mixture was stirred for two more hours at about 25 to 30° C. The reaction mixture was then decomposed into a two-phase system by adding ice and dilute acetic acid. The organic solvent phase was separated, the aqueous phase was extracted by shaking with benzene and the organic phases were combined. After drying, the organic solvent was evaporated and the residue was distilled in vacuo. 63 gm. of a liquid having a boiling point of 133 to 134° C. at 0.1 mm. Hg were obtained, which solidified after standing for a short period of time. After recrystallization from petroleum ether a colorless crystalline product having a melting point of 63° C. was obtained. It was identified to be the compound of the formula

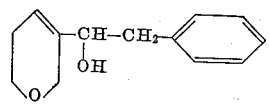

EXAMPLE III

Mono-succinic acid ester of (5,6-dihydropyranyl-3)-propyl-carbinol

A mixture of 20 gm. of (5,6-dihydropyranyl-3)-propyl-carbinol, 12 gm. of succinic acid anhydride and 100 ml.

of anhydrous toluene was refluxed for ten hours. After cooling, an aqueous solution of sodium bicarbonate was added, the mixture was shaken and the organic solvent phase was separated and was extracted two additional times with an aqueous sodium bicarbonate solution. The aqueous solutions thus obtained were combined and made just acid with dilute acetic acid. The precipitate formed thereby was taken up in ether. After drying the ether solution over sodium sulfate, the solvent was evaporated. 16 gm. of a liquid having a boiling point of 195° C. at 2 mm. Hg (decomposition) were obtained. It was identified to be the compound of the formula

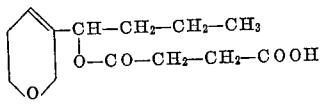

EXAMPLE IV

*Acetic acid ester of (5,6-dihydropyranyl-3)-propyl-carbinol*

(a) A mixture of 10 gm. of (5,6-dihydropyranyl-3)-propyl-carbinol, 50 ml. of acetic acid anhydride and 4 gm. of anhydrous sodium acetate was heated for three hours on a boiling water bath. At the end of this period water was added and the solution was neutralized with sodium bicarbonate. The oil precipitated thereby was taken up in ether, the solvent was driven off by heating and the oily residue was distilled. 9 gm. of a liquid having a boiling point of 126° C. at 12 mm. Hg were obtained. It was identified to be the compound of the formula

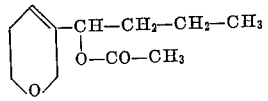

(b) 7.5 ml. of acetyl chloride were added dropwise, while stirring and cooling, to a solution of 16 gm. of (5,6-dihydropyranyl-3)-propyl-carbinol in 50 ml. of anhydrous pyridine, taking care that the temperature of the mixture did not rise above 20° C. After all of the acetyl chloride had been added, the reaction mixture was stirred at room temperature for another three hours, poured into water and the aqueous mixture was extracted by shaking with ether. The excess pyridine was removed by shaking with dilute hydrochloric acid. The ether phase was separated and was washed first with an aqueous sodium bicarbonate solution and then with water. After drying the ethereal solution over sodium sulfate, the ether was evaporated and the residue was distilled. 14.5 gm. of a colorless liquid having a boiling point of 126 to 127° C. at 12 mm. Hg were obtained. It was identified to be the compound of the formula shown under (a) above.

EXAMPLE V

*(5,6-dihydropyranyl-3)-(p-methoxy-phenylethyl)-carbinol*

A solution of 13 gm. of p-methoxy-phenylethyl chloride in a small amount of ether was added dropwise, while stirring, to 1.85 gm. of magnesium powder in a small amount of ether. After all of the solution had been added, the reaction mixture was refluxed for one hour on a water bath. Thereafter, the Grignard reagent, p-methoxy-phenylethyl-magnesium chloride, thus obtained was cooled to about 5 to 10° C. and at this temperature a solution of 8 gm. of 5,6-dihydropyranyl-3-aldehyde in ether was added dropwise thereto while stirring. After all of the aldehyde solution had been added, the reaction mixture was stirred at room temperature for two more hours. Thereafter, the reaction mixture was decomposed into a two-phase system by adding some ice and dilute acetic acid, the ether phase was separated, shaken with an aqueous sodium bicarbonate solution and then with water, dried over sodium sulfate and the ether solvent was evaporated. 6 gm. of a colorless liquid having a boiling point of 172° C. at 0.2 mm. Hg were obtained. It was identified to be the compound of the formula

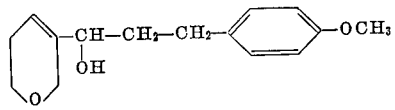

EXAMPLE VI

*(2,3-dihydropyranyl-2)-butyl-carbinol*

A solution of 11.2 gm. of 2-formyl-2,3-dihydropyran in anhydrous ether was added dropwise at about 5 to 10° C., while stirring, to a Grignard reagent prepared from 4.9 gm. magnesium and 27.4 gm. butyl bromide in ether. After all of the solution had been added, the reaction mixture was stirred for one more hour at room temperature and then ice and dilute acetic acid were added thereto. The reaction mixture divided into an aqueous phase and an ether phase. The ether phase was separated, washed first with an aqueous sodium bicarbonate solution and then with water and was finally dried over sodium sulfate. The residue remaining behind after driving off the ether was distilled in vacuo, yielding 12 gm. of a colorless oil having a boiling point of 77 to 79° C. at 0.3 mm. Hg. It was identified to be the compound of the formula

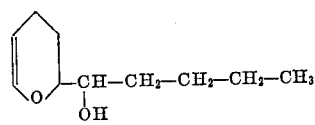

EXAMPLE VII

Using a procedure analogous to that described in Example I, 21 gm. of (5,6-dihydropyranyl-3)-ethyl-carbinol, of the formula

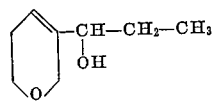

having a boiling point of 83 to 84° C. at 0.15 mm. Hg, were obtained from 30 gm. 3-formyl-5,6-dihydropyran and a Grignard reagent prepared from 44 gm. ethyl-bromide and 9.7 gm. magnesium.

EXAMPLE VIII

Using a procedure analogous to that described in Example I, 9 gm. of (5,6-dihydropyranyl-3)-butyl-carbinol, of the formula

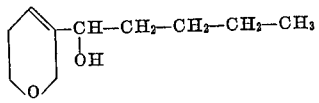

having a boiling point of 98° C. at 0.15 mm. Hg, were obtained from 8.5 gm. 3-formyl-5,6-dihydropyran and a Grignard reagent prepared from 13.7 gm. butyl bromide and 2.4 gm. magnesium.

EXAMPLE IX

Using a procedure analogous to that described in Example I, 14 gm. of (5,6-dihydropyranyl-3)-isopropyl-carbinol, of the formula

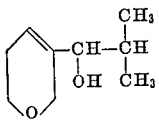

having a boiling point of 78° C. at 0.15 mm. Hg, were obtained from 11.5 gm. 3-formyl-5,6-dihydropyran and a Grignard reagent prepared from 18.4 gm. isopropyl bromide and 3.6 gm. magnesium.

EXAMPLE X

Using a procedure analogous to that described in Example I, 12.5 gm. of (5,6-dihydropyranyl-3)-pentyl-carbinol, of the formula

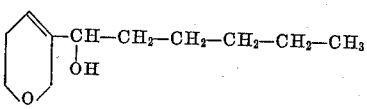

having a boiling point of 107° C. at 0.2 mm. Hg, were obtained from 11.5 gm. 3-formyl-dihydropyran and a Grignard reagent prepared from 22.6 gm. amyl bromide and 3.6 magnesium.

EXAMPLE XI

Using a procedure analogous to that described in Example II, 14 gm. of (5,6-dihydropyranyl-3)-β-phenyl-ethyl-carbinol, of the formula

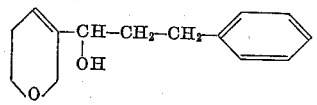

having a boiling point of 162 to 163° C. at 0.3 mm. Hg, were obtained from 11.5 gm. 3-formyl-5,6-dihydropyran and a Grignard reagent prepared from 27.8 gm. β-phenyl-ethyl chloride and 3.6 magnesium.

EXAMPLE XII

Using a procedure analogous to that described in Example II, 15 gm. of (5,6-dihydropyranyl-3)-phenyl-isopropyl-carbinol, of the formula

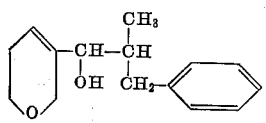

having a boiling point of 175 to 177° C. at 0.5 mm. Hg, were obtained from 11.5 gm. 3-formyl-5,6-dihydropyran and a Grignard reagent prepared from 30.0 gm. β-bromo-isopropyl-benzene.

EXAMPLE XIII

Using a procedure analogous to that described in Example II, 16 gm. of (5,6-dihydropyranyl-3)-(p-methyl-benzyl)-carbinol, of the formula

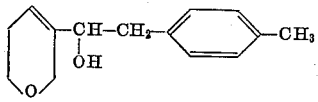

having a boiling point of 157 to 158° C. at 0.2 mm. Hg, were obtained from 11.5 gm. 3-formyl-5,6-dihydropyran and a Grignard reagent prepared from 27.8 gm. p-xylyl-bromide and 3.6 gm. magnesium.

EXAMPLE XIV

Using a procedure analogous to that described in Example I, 10 gm. of (2,3-dihydropyranyl-2)-propyl-carbinol, of the formula

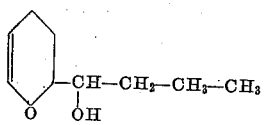

having a boiling point of 54° C. at 0.3 mm. Hg, were obtained from 11.2 gm. 2-formyl-2,3-dihydropyran and a Grignard reagent prepared from 18.5 gm. propyl bromide and 3.6 gm. magnesium.

The novel dihydropyranyl-carbinols embraced by Formula I above possess pharmacological properties. More particularly, they exhibit strong choleretic and distinct sedative activities. Their toxicity is extremely low. For example (5,6-dihydropyranyl-3)-benzyl-carbinol according to the present invention has a peroral $LD_{50}$ of 300 mg./kg. in mice. In addition, this particular compound has another important advantage in that, contrary to all known choleretic carbinols, it is solid at room temperature, which substantially facilitates its compounding into solid pharmaceutical compositions.

In addition, the mono-esters with polybasic hydrocarbon carboxylic acids are capable of forming water-soluble salts.

For pharmacological purposes the compounds according to the present invention are perorally administered in dosage unit form, the single dose being 25 to 200 mgm., preferably 75 to 100 mgm.

The dosage unit may be in any form suitable for oral administration comprising the active ingredients of the invention alone or uniformly distributed in a suitable inert pharmaceutical carrier. In addition to the compounds according to the invention the dosage units may also contain a neurotropic spasmolytic, such as atropine sulfate, or a myotropic spasmolytic, such as 1-(p-ethoxy-phenyl)-1-diethylamino-1-methyl-1-phenyl-propane hydrochloride.

The following examples illustrate various orally administrable dosage unit compositions which may be used to administer the compounds of the invention to warm-blooded animals requiring choleretic therapy. The parts are parts by weight, unless otherwise specified.

EXAMPLE XV

*Capsules.*—100 mgm. of undiluted (5,6-dihydropyranyl-3)-propyl-carbinol are filled into No. 2 soft gelatin capsules (Scherer Rotary Die Process) and the capsules are sealed.

EXAMPLE XVI

*Drops.*—A solution is compounded from the following ingredients:

| | |
|---|---|
| (5,6-dihydropyranyl-3)-propyl-carbinol, parts | 5.0 |
| Ethanol, parts by vol. | 60.0 |
| Peppermint oil, parts | 0.3 |
| Saccharin sodium, parts | 0.2 |
| Distilled water, parts by vol. q.s.ad | 100.0 |

*Compounding procedure.*—The (5,6 - dihydropyranyl-3)-propyl-carbinol and the oil of peppermint are dissolved in the ethanol. The saccharin sodium is dissolved in the water. The aqueous saccharin solution is added in small portions to the ethanolic solution, accompanied by stirring. The resulting liquid composition is then filled into containers of convenient size provided with a dropper attachment, from which it is dispensed in dropwise fashion. 1 cc. of the liquid composition contains 50 mgm. of the active ingredient.

EXAMPLE VII

*Emulsion.*—The emulsion is compounded from the following ingredients:

| | Parts |
|---|---|
| (5,6-dihydropyranyl-3)propyl-carbinol | 20.0 |
| Cane sugar | 250.0 |
| Silicic acid | 17.5 |
| Polyethyleneglycol-sorbitol-monolaurate (Tween 20) | 30.0 |
| Polyethyleneglycol 400 | 50.0 |
| Carboxymethyl cellulose (high viscosity) | 7.0 |
| Oil of peppermint | 1.0 |
| Saccharin sodium | 1.0 |
| p-Hydroxy-benzoic acid methyl ester | 0.7 |
| p-Hydroxy-benzoic acid propyl ester | 0.3 |
| Distilled water q.s.ad 1000.0 parts by vol. | |

*Compounding procedure.*—The (5,6 - dihydropyranyl-3)-propyl-carbinol, the polyethyleneglycol-sorbitol-mono-laurate, the polyethyleneglycol 400 and the oil of peppermint are admixed with each other. The water is heated to 80°C. and, while stirring, the p-hydroxybenzoic acid esters, the sugar and the carboxymethyl cellulose are dissolved therein. The resulting solution is cooled to 30° C. while stirring, and then the saccharin sodium is dissolved therein. Subsequently, the silicic acid is stirred into the solution, resulting in a suspension into which the mixture containing the active ingredient is poured while vigorously stirring. The resulting suspension is thoroughly stirred and then homogenized. A 5 cc. portion of this emulsion contains 100 mgm. of (5,6-dihydropyranyl-3)-propyl-carbinol.

EXAMPLE XVIII

*Capsules containing a carbinol of the invention in combination with a neurotropic spasmolytic*

The capsule contents are compounded from the following ingredients:

|  | Parts |
|---|---|
| (5,6-dihydropyranyl-3)-propyl-carbinol | 100.0 |
| Atropine sulfate | 1.0 |
| Beeswax | 5.0 |

*Compounding procedure.*—The (5,6-dihydropyranyl-3)-propyl-carbinol is heated to 70°C. and the beeswax is dissolved therein. The resulting solution is cooled to about 30°C. and then the atropine sulfate, in a finely divided state, is stirred into the solution until uniformly distributed therein. 106 mgm. portions of this mixture are then filled into No. 2 soft gelatin capsules (Scherer Rotary Die Process). Each capsule contains 100 mgm. of (5,6-dihydropyranyl-3)-propyl-carbinol and 1 mgm. of atropine sulfate.

EXAMPLE XIX

*Capsules containing a carbinol of the invention in combination with a myotropic spasmolytic*

The contents of the capsules are compounded from the following ingredients:

|  | Parts |
|---|---|
| (5,6-dihydropyranyl-3)-propyl-carbinol | 100.0 |
| 1-(p-ethoxyphenyl)-1-diethylamino-1-methyl-1-phenyl-propane hydrochloride | 50.0 |
| Beeswax | 7.0 |

*Compounding procedure.*—The (5,6-dihydropyranyl-3)-propyl-carbinol is heated to about 70°C. and the beeswax is dissolved therein. The resulting solution is then cooled to about 30°C. and the tertiary amine spasmolytic ingredient, in a finely divided state, is stirred into the solution until uniformly distributed therein. 157 mgm. portions of the resulting mixture are then filled into No. 3 soft gelatine capsules (Scherer Rotary Die Process). Each capsule contains 100 mgm. of the choleretic ingredient and 50 mgm. of the spasmolytic ingredient.

EXAMPLE XX

*Capsules containing a carbinol of the invention in combination with a myotropic spasmolytic, a prophylactic and a vitamin $B_1$*

The contents of the capsules are compounded from the following ingredients:

|  | Parts |
|---|---|
| (5,6-dihydropyranyl-3)-propyl-carbinol | 100.0 |
| 1-(p-ethoxyphenyl)-1-diethylamino-1-methyl-1-phenyl-propane hydrochloride | 50.0 |
| Thiamine mononitrate | 5.0 |
| Nicotinamide | 15.0 |
| Beeswax | 6.0 |

*Compounding procedure.*—The (5,6-dihydropyranyl-3)-propyl - carbinol is heated to about 70° C. and the beeswax is dissolved therein. The resulting solution is cooled to about 30° C. and then the remaining ingredients, in a finely divided state, are stirred into the solution until uniformly distributed therein. 176 mgm. portions of the resulting mixture are filled into soft gelatin capsules of a suitable size (Scherer Rotary Die Process). Each capsule contains 100 mgm. of the choleretic ingredient, 50 mgm. of the spasmolytic, 5 mgm. of the vitamin $B_1$ factor and 15 mgm. of the prophylactic.

EXAMPLE XXI

*Tablets*

|  | Parts |
|---|---|
| (5,6-dihydropyranyl-3)-benzyl-carbinol | 100.0 |
| Lactose | 200.0 |
| Potato starch, dried | 100.0 |
| Potato starch, not dried | 28.0 |
| Soluble starch | 10.0 |
| Alginic acid | 10.0 |
| Magnesium stearate | 2.0 |
|  | 450.0 |

*Compounding procedure.*—The active ingredients, lactose and dried potato starch are mixed in a blender and kneaded with a 10% solution of the soluble starch in water. The moist granulate is passed through a 1.5 mm. mesh screen and is dried at 45° C. The dried mass is admixed with the remaining auxiliary materials. The mass thus obtained is pressed into tablets weighing 450 mgm. each.

EXAMPLE XXIX

*Coated tablets*

The tablets obtained in Example XXI are coated with a shell consisting mainly of sugar and talcum. The finished coated tablets are polished with the aid of beeswax.

EXAMPLE XXIII

*Suppositories*

The suppositories are compounded from the following ingredients:

|  | Parts |
|---|---|
| (5,6-dihydropyranyl-3)-benzyl-carbinol | 150.0 |
| Cocoa butter | 1600.0 |
|  | 1750.0 |

*Compounding procedure.*—The cocoa butter is melted on a water bath and the finely pulverized active ingredient is stirred in at a temperature of about 36° C. At this same temperature the composition is poured into cooled suppository molds holding 1750 mgm. of the composition.

EXAMPLE XXIV

*Hard gelatin capsules*

The contents of the capsules are compounded from the following ingredients:

|  | Parts |
|---|---|
| (5,6-dihydropyranyl-3)-benzyl-carbinol | 75.0 |
| Lactose | 75.0 |
| Talcum | 10.0 |
|  | 160.0 |

*Compounding procedure.*—The ingredients are admixed with each other, and the mixture is filled into hard gelatin capsules holding 160 mgm. of the mixture.

EXAMPLE XXV

*Suspension*

The suspension is compounded from the following ingredients:

|  | Parts |
|---|---|
| (5,6-dihydropyranyl-3)-benzyl-carbinol | 2.0 |
| Carboxymethylcellulose (high viscosity) | 0.5 |
| Silica gel | 1.5 |
| p-Hydroxybenzoic acid methyl ester | 0.07 |
| p-Hydroxybenzoic acid propyl ester | 0.03 |
| Cocoa essence | 1.5 |
| Sucrose | 22.0 |
| Glycerin | 10.0 |
| Distilled water, parts by vol. | 72.4 |

*Compounding procedure.*—The water is heated to 80° C. The p-hydroxybenzoic acid esters are dissolved in the hot water, while stirring. The solution is cooled to 30° C. and the glycerin is added, and then, while stirring, the mixture of sucrose and carboxymethylcellulose is added in small portions at a time. Then the silica gel, the finely milled active ingredient and the cocoa essence are stirred in. The mixture is stirred until a homogeneous suspension is obtained. 5 cc. of the suspension contain 100 mgm. of the active ingredient.

EXAMPLE XXVI

Drops

The drop solution is compounded from the following ingredients:

| | Parts |
|---|---|
| (5,6-dihydropyranyl-3)-benzyl-carbinol | 7.5 |
| Ethanol | 20.0 |
| Glycerin | 30.0 |
| Polyethylene glycol 600 | 20.0 |
| p-Hydroxybenzoic acid methyl ester | 0.035 |
| p-Hydroxybenzoic acid propyl ester | 0.015 |
| Soluble saccharin | 0.5 |
| Oil of anise | 0.05 |
| Menthol | 0.06 |
| Distilled water, q.s. ad, parts by vol. | 100.0 |

*Compounding procedure.*—A mixture of ethanol, the glycerin, the polyethylene glycol and the oil of anise, and the methanol, the p-hydroxybenzoic acid esters and the active ingredient are dissolved in the mixture in that sequence (Solution 1). The saccharin is dissolved in the water (Solution 2). Solution 2 is added, while stirring, to Solution 1, and the combined solution is passed through a suitable filter. 1 cc. of the liquid composition contains 75 mgm. of the active ingredient.

EXAMPLE XXVII

Compressed tablets

The tablet composition is compounded from the following ingredients:

| | Parts |
|---|---|
| (5,6-dihydropyranyl-3)-benzyl-carbinol | 100.0 |
| 1-(p-ethoxyphenyl)-1-diethylamino-1-methyl-1-phenyl-propane hydrochloride | 75.0 |
| Lactose | 125.0 |
| Potato starch, dried | 100.0 |
| Potato starch, not dried | 28.0 |
| Soluble starch | 10.0 |
| Alginic acid | 10.0 |
| Magnesium stearate | 2.0 |
| | 450.0 |

*Compounding procedure.*—The 1-(p-ethoxyphenyl)-1-diethylamino-1-methyl-1-phenyl-propane hydrochloride is kneaded into a mixture of 8 parts of carbon tetrachloride and 3 parts of ethanol, the mass is dried at 45° C. and passed through a 1.5 mm. mesh screen (Granulate 1). The (5,6-dihydropyranyl-3)-benzyl-carbinol, the lactose and the dried potato starch are admixed and kneaded with a 15% solution of the soluble starch in water, passed through a 1.5 mm. mesh screen and dried at 45° C. The dried granulate thus obtained is passed once again through the 1.5 mm. mesh screen (Granulate 2). Granulate 1 and Granulate 2 are admixed in the required proportion with the remaining auxiliary materials and the mixture is pressed into tablets weighing 450 mgm. each.

EXAMPLE XXVIII

Sugar-coated tablets

The tablets prepared in Example XXVII are sugar-coated in the usual maner with a coating consisting mainly of sugar and talcum. The finished coated tablets are polished with the aid of beeswax.

Although the preceding dosage unit composition examples illustrate only (5,6-dihydropyranyl)-propyl- and (5,6-dihydropyranyl)-benzyl - carbinol as active ingredients, it should be understood that any of the other compounds embraced by Formula I may be substituted therefor. Moreover, the amounts of the compounds of the present invention in the dosage unit composition may vary within the dosage limits set forth above to meet particular requirements.

While the present invention has been illustrated with the aid of certain specific embodiments thereof, it will be readily apparent to others skilled in the art that the invention is not limited to these specific embodiments, and that various changes and modifications may be made without departing from the spirit of the invention or the scope of the appended claims.

I claim:

1. A compound of the formula

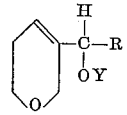

wherein

R is selected from the group consisting of alkyl of 2 to 6 carbon atoms and $Z-R_1$,
Z is alkylene of 1 to 6 carbon atoms,
$R_1$ is selected from the group consisting of phenyl, lower alkoxy-phenyl and lower alkyl-phenyl, and
Y is selected from the group consisting of hydrogen, lower alkanoyl and monocarboxyl-lower alkanoyl.

2. A compound of claim 1 wherein Y is hydrogen.
3. (5,6-dihydropyranyl-3)-benzyl-carbinol.
4. (5,6-dihydropyranyl-3)-n-propyl-carbinol.
5. (5,6-dihydropyranyl-3)-n-butyl-carbinol.
6. (5,6-dihydropyranyl-3)-n-pentyl-carbinol.
7. (5,6-dihydropyranyl-3)-β-phenyl-ethyl-carbinol.
8. The succinic acid monoester of (5,6-dihydropyranyl-3)-n-propyl-carbinol.

References Cited by the Examiner

UNITED STATES PATENTS

| 2,610,193 | 9/1952 | Whetstone | 260—345.8 |
| 3,159,653 | 12/1964 | Falbe et al. | 260—345.9 |
| 3,175,943 | 3/1965 | Molho et al. | 167—55 |
| 3,183,151 | 5/1965 | Nordmann | 167—55 |

WALTER A. MODANCE, *Primary Examiner.*

NORMA S. MILESTONE, *Assistant Examiner.*